US006295606B1

(12) United States Patent
Messerges et al.

(10) Patent No.: US 6,295,606 B1
(45) Date of Patent: Sep. 25, 2001

(54) METHOD AND APPARATUS FOR PREVENTING INFORMATION LEAKAGE ATTACKS ON A MICROELECTRONIC ASSEMBLY

(75) Inventors: Thomas S. Messerges, Schaumburg; Ezzat A. Dabbish, Cary; Larry Puhl, West Dundee, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/360,585

(22) Filed: Jul. 26, 1999

(51) Int. Cl.[7] .............................. G06F 12/14; H04L 9/28
(52) U.S. Cl. ................................................ 713/189; 380/1
(58) Field of Search .................................. 380/1; 713/189

(56) References Cited

U.S. PATENT DOCUMENTS 5,168,521 * 12/1992 Delaporte et al. ...................... 380/29
5,796,837 * 8/1998 Kim et al. ............................... 380/28

OTHER PUBLICATIONS

Wayner. "Code Breaker Cracks Smart Card's Digital Safe". The New York Times. Jun. 22, 1998, pp. 1–5.*
Kocher et al. "Introduction to Differential Power Analysis and Related Attacks". Cryptography Research, Inc. 1998. pp. 1–7.*
Biham et al. "Differential Fault Analysis of Secret Key Cryptosystems". Advances in Cryptology: Proceedings of Crypto '97. Springer–Verlag. Aug. 1997. pp. 513–525.*
"Investigations of Power Analysis Attacks on Smartcards." Thomas S. Messerges, Ezzy A. Dabbish and Robert H. Sloan, Proceedings of USENIX Workshop on Smartcard Technology, May 1999, pp. 1–11.

* cited by examiner

Primary Examiner—Gail Hayes
Assistant Examiner—Bryan S. Latham
(74) Attorney, Agent, or Firm—Terri S. Hughes; K. Cyrus Khosravi

(57) ABSTRACT

An apparatus and method for preventing information leakage attacks on a microelectronic assembly is described for performing a cryptographic algorithm by transforming a first function, used by the cryptographic algorithm, into a second function. The method includes receiving (1102) a masked input data having n number of bits that is masked with an input mask, wherein n is a first predetermined integer. The method also includes processing (1104) the masked input data using a second function based on a predetermined masking scheme, and producing (1106) a masked output data having m number of bits that is masked with an output mask, wherein m is a second predetermined integer.

12 Claims, 8 Drawing Sheets

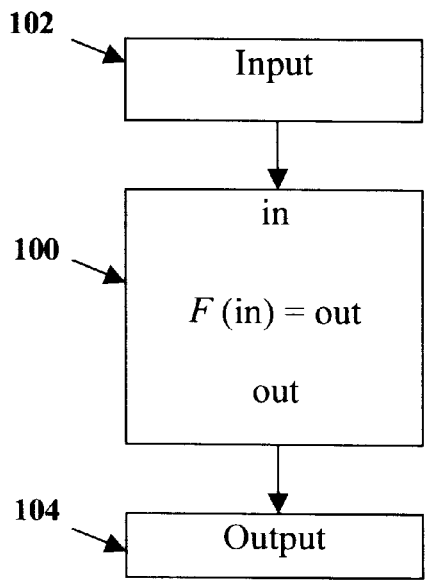
PRIOR ART
FIG. 1
| Row | in | | | out = F (in) | |
|---|---|---|---|---|---|
| | A2 | A1 | A0 | B1 | B0 |
| 0 | 0 | 0 | 0 | 1 | 0 |
| 1 | 0 | 0 | 1 | 0 | 0 |
| 2 | 0 | 1 | 0 | 1 | 1 |
| 3 | 0 | 1 | 1 | 1 | 0 |
| 4 | 1 | 0 | 0 | 0 | 0 |
| 5 | 1 | 0 | 1 | 0 | 1 |
| 6 | 1 | 1 | 0 | 1 | 1 |
| 7 | 1 | 1 | 1 | 0 | 1 |
200
PRIOR ART
FIG. 2
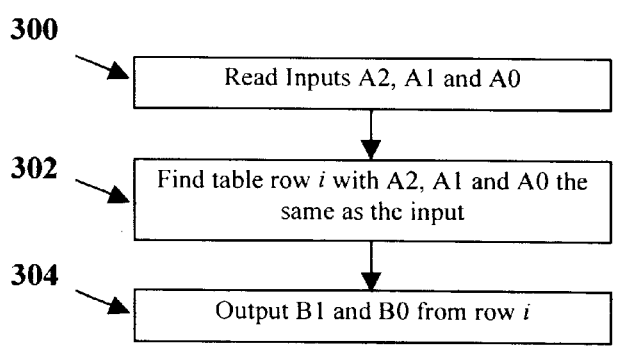
PRIOR ART
FIG. 3

| Row | in | | | out = FP(in) | |
|---|---|---|---|---|---|
| | A2 | A1 | A0 | B1 | B0 |
| 0 | 0 | 0 | 0 | 1 | 1 |
| 1 | 0 | 0 | 1 | 1 | 0 |
| 2 | 0 | 1 | 0 | 0 | 1 |
| 3 | 0 | 1 | 1 | 1 | 1 |
| 4 | 1 | 0 | 0 | 0 | 0 |
| 5 | 1 | 0 | 1 | 1 | 0 |
| 6 | 1 | 1 | 0 | 0 | 0 |
| 7 | 1 | 1 | 1 | 0 | 1 |

RIN = 0 1 1
ROUT = 0 1

METHOD AND APPARATUS FOR PREVENTING INFORMATION LEAKAGE ATTACKS ON A MICROELECTRONIC ASSEMBLY

FIELD OF THE INVENTION

The present invention relates generally to the security of cryptographic processing in microelectronic assemblies, such as smartcards and the like cryptographic tokens, and more particularly to methods of preventing security breach of the same when a differential power analysis attack is used.

BACKGROUND OF THE INVENTION

Cryptographic devices use secret keys to process input information and/or to produce output information. It is generally assumed that the input and the output information is available to attackers, however, information about the secret keys is unavailable to the attackers. Recently, it has been shown that Differential Power Analysis (DPA) can be utilized by attackers to gain information about secret keys used in cryptographic devices. For example, as described in Introduction to Differential Power Analysis and Related Attacks, by Paul Kocher et al., DPA attacks utilize leaked information to gain knowledge of a secret key used by a cryptographic device. In particular, an attacker mounting a DPA attack monitors the power consumption of a cryptographic device to learn information about its secret keys. However, in general, leaked information in the form of electromagnetic radiation, timing, faulty outputs . . . , etc. can also be monitored. After monitoring multiple operations, a malicious attacker can obtain the secret keys used by the cryptographic device.

A common type of cryptosystem uses a block cipher for the encrypt and decrypt operations. A block cipher operates on a fixed number of input bits and encrypts or decrypts these bits into a fixed number of output bits. The encrypt and decrypt functions are often constructed using a simple function called a round function. The security of the cryptographic algorithm is achieved by repeatedly applying the round function a fixed number of times. Such a cipher is referred to as an iterative-block cipher.

An example of a commonly known iterative-block cipher is the Data Encryption Standard (DES). DES is described in detail in ANSI X.392, "American National Standard for Data Encryption Algorithm (DEA)," American Standards Institute, 1981, which is incorporated by reference herein. One of the major components of the round function of DES is the substitution box (S-box) functions. The S-box functions are non-linear and are conventionally implemented using table lookups or Boolean logic gates.

Present implementations of iterative-block ciphers need to use the secret key each time a round function is calculated. When this secret key is accessed by a cryptographic device, information about the secret key is leaked outside the device and can be monitored by an attacker. The information that is leaked is often very subtle and difficult to interpret. However, because this information is correlated to the actual secrets within the device, an attacker can use statistical techniques, such as a DPA attack, to effectively amplify the information and breach the security of the cryptosystem.

Statistical attacks, such as a DPA attack, are successful because the leaked information is correlated to the secret keys. Decorrelating the data being processed by the round function from the secret key data is therefore desirable. The revelation of the secret key data is considered a breach of the security of a cryptographic device. Therefore, a need exists for a way to prevent leakage attacks so that an attacker cannot gain information about the secret keys used in cryptographic devices.

BRIEF DESCRIPTION OF THE DRAWINGS

FIG. 1 is a representation of a block diagram of a conventional means to compute a cryptographic function in a microelectronic device.

FIG. 2 is a representation of an example of a table that is used in the conventional table lookup process of calculating a function of inputs and producing outputs.

FIG. 3 is a representation of a flowchart illustrating the steps in calculating a function using the conventional table lookup process.

DETAILED DESCRIPTION OF THE PREFERRED EMBODIMENTS

Figure 4:
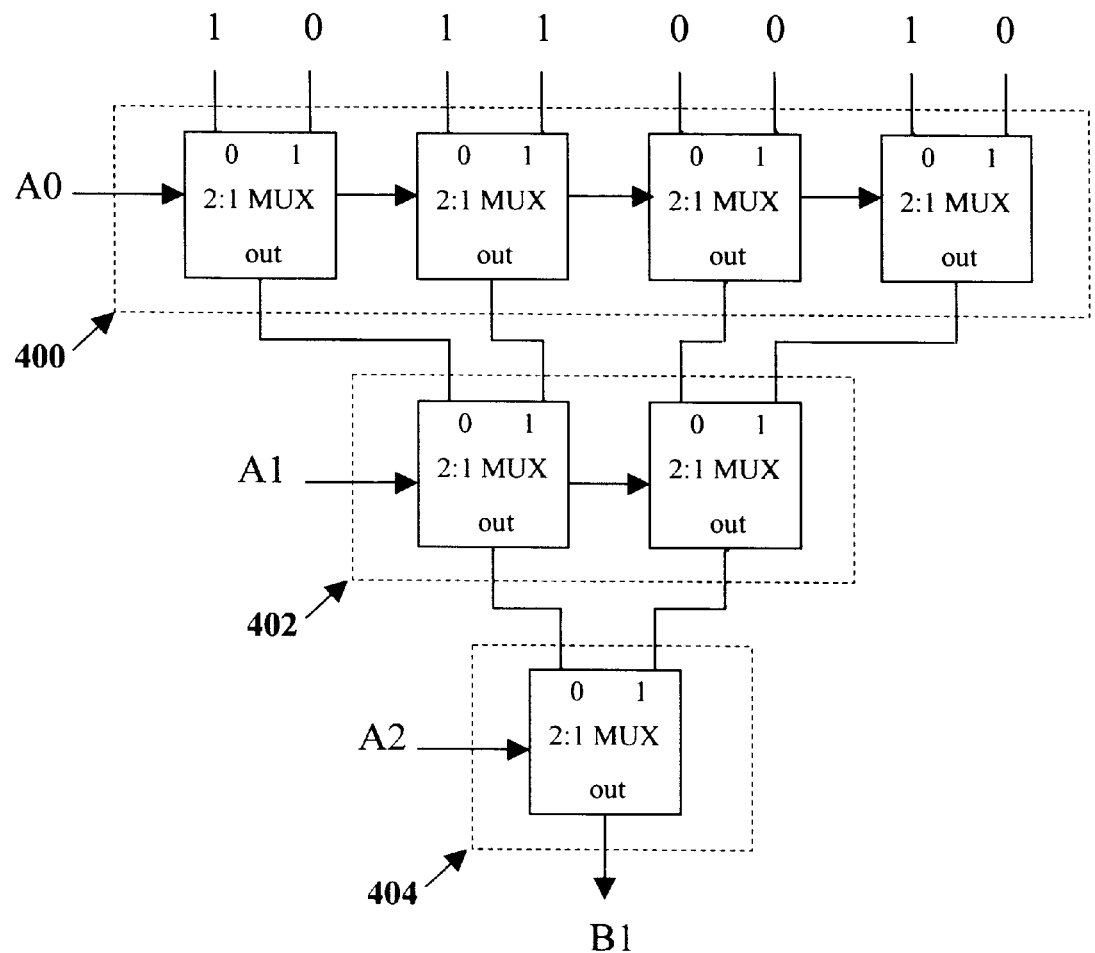
FIG. 4 is a representation of an example of a conventional apparatus for calculating a function using a multiplexer circuit.

The present invention provides a method to randomize the calculations of an algorithm, such as a round function in an iterative-block cipher. The security of microelectronic assembly implementing a cryptographic algorithm is increased when the calculation of the algorithm can be performed in a randomized fashion because information leaking from the assembly will not reveal information about the secret data.

In a conventional implementation of a cryptographic algorithm, the leaked information is correlated to the secret data, thus enabling an attack. The present invention provides a method and apparatus that will decorrelate the leaked information from the secret data. Two data items can be decorrelated from one another by using a random mask that is combined with one or both of the data items to eliminate the correlation. It should be noted that the use of a random mask implies that the data that is masked can also be unmasked, if the random mask is known.

In a cryptographic cipher, one way to accomplish the decorrelation of the secret key data from the leaked information is to mask the inputs to the round function and to also mask the outputs of the round function. If all data is processed in a masked form, then all the information that is leaked will be useless to a malicious attacker. The cryptographic cipher will still produce correct outputs if, after the last iteration of the rounds, the masked output can be unmasked to reveal the true output. Thus, a need exists for a method that can calculate a function of masked inputs and produce masked outputs. The present invention provides a method and apparatus that computes a function on masked inputs, rather than the true inputs, and produces a masked output that can be unmasked to reveal the true output.

The present invention provides for randomizing the internal data being processed by a function. This process of randomization is called masking. When data D is masked with RAMASK the result is denoted as D_RAMSK. The preferred approach for masking according to the invention is the bitwise Boolean XOR operation as given in the following formula:

$$D\_RMASK = D \oplus RMASK \qquad (1)$$

In the preferred embodiment according to the present invention, the masks are randomly generated. Thus, if D represents the secret data and RAMSK is random, then an attacker monitoring information leakage pertaining to D_RMASK will not learn any information about the secret data represented by D.

Turning now to the drawings, where like numerals designate like components, a block diagram of a conventional means to compute a cryptographic function in a microelectronics device is illustrated in FIG. 1. The box labeled 100 represents the function F that needs to be calculated. The input and output of function F are labeled 102 and 104, respectively. In the conventional implementation of FIG. 1, the input and output data are unmasked and the hardware used for the computation of F is vulnerable to leakage attacks.

One conventional way to implement an arbitrary function is to use the table-lookup method. An illustrative example of a table that can be used in the table-lookup method is shown in FIG. 2. In FIG. 2, table 200 lists the outputs associated with each input. In this example, the function F(A1, A2, A3) represented by table 200 has three inputs: A2, A1, and A0 and two outputs: B1 and B0. Of course table 200 is just an example. In a cryptosystem, the tables may need to be larger. As is known to one skilled in the art, for DES a larger table is needed to implement the S-box function which has six inputs and four outputs. The DES algorithm utilizes eight different S-box functions, so eight tables would be needed and each table would have 64 rows. Each row in an S-box table corresponds to one of the possible input combinations of the six input bits.

A flowchart of a conventional method to compute a function using a table lookup method is given in FIG. 3. This method begins in box 300 by reading the inputs into function. The example of FIG. 3 implements the function F(A1, A2, A3) described in FIG. 2, so there are three inputs to be read. The next step 302, in the conventional method, is to find the row i in the lookup table that corresponds to the given input. Finally, at step 304, the data from the output column listed in row i is given as the output of the function. Any function can be implemented by this table lookup method, but unfortunately, this conventional method of implementation is vulnerable to leakage attacks.

A conventional apparatus to compute the output of an arbitrary function is to use a tree of 2:1 multiplexers. As an example consider the function F (a, b, c, d, e) with the five inputs: a, b, c, d and e. One of these inputs can be used to choose between two functions of the remaining four inputs. Then, one of the four inputs to the four input functions can be used to choose between two functions of the remaining three inputs. This process can be repeated until there are no more inputs or the functions of the remaining inputs are simple enough to compute using a few numbers of gates.

An apparatus implementing a Boolean function using the above approach results in a multiplexer tree. FIG. 4 gives an example of a multiplexer tree circuit that implements the function F(A1, A2, A3) defined in table 200 of FIG. 2. In the example of FIG. 4 there are three layers of 2:1 multiplexers labeled 400, 402 and 404. Each 2:1 multiplexer within a layer is labeled "2:1 MUX" and has two data inputs, a select input and one data output. The select input is used to select one of the two data inputs to be the data output. The first layer 404 contains one multiplexer which is controlled with input A2. The multiplexer in layer 404 chooses between two functions of the remaining inputs, A1 and A0. The second layer 402 contains two multiplexers controlled by input A1 which selects from functions of the remaining input A0. The last layer 400 contains four multiplexers and selects the actual output bit that is defined by the function F(A1, A2, A3) that is being implemented. One skilled in the art will recognize that the example of FIG. 4 is an illustrative example and that there are straightforward techniques to simplify this circuit. As an example, the top two layers of the multiplexer tree can be replaced with a circuit that generates all possible functions of the two remaining inputs. The outputs of this circuit could then be used as inputs to the next layer down. Unfortunately, the conventional implementations of an apparatus to compute a Boolean function are susceptible to leakage attacks, thus pose a security problem.

Figures 5, 6:
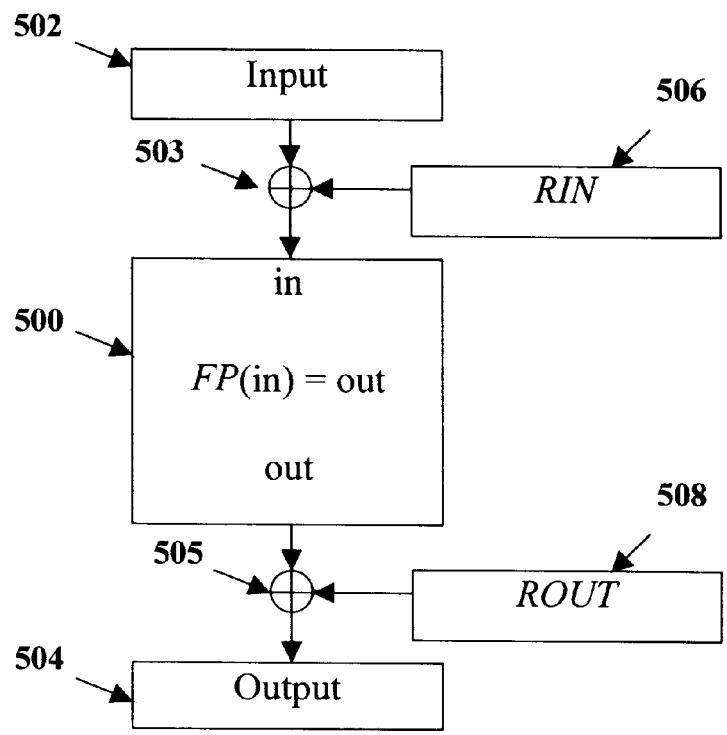
FIG. 5 is a representation of a block diagram of the preferred embodiment of the present invention used to calculate a function of masked inputs and produce masked outputs.
FIG. 6 is a representation of a preferred embodiment of a table that is used in the table lookup process of calculating a function of masked inputs and producing masked outputs.

The top-level block diagram of the preferred embodiment of the present invention is given in FIG. 5. The diagram of FIG. 5 implements the original function F, but uses a function FP of box 500 to do the actual computation. That is, given an input 502, the output 504 will be the same as if the original function F were used, but instead function FP in box 500 will be used. The input 502 to the function 500, is masked with a random mask 506, called RIN. The masking is accomplished using a bitwise XOR gate 503. The function in box 500 implements FP, which is a scrambled version of the original function F. The output of FP is masked, so in order to get back the correct output it needs to be unmasked. The mask 508, called ROUT, is combined with the output of 500 using XOR gate 505 to produce the correct output 504.

The function FP is calculated such that the block diagram of FIG. 5 produces the same output as the original function F. This can be accomplished if the function FP is defined as follows:

$$FP(in) = ROUT \oplus F(in \oplus RIN)$$

The function FP can be implemented using the conventional table-lookup technique The lookup table for FP is derived from the conventional lookup table that was used for F, but the data is rearranged and masked. FIG. 6 gives the new, rearranged table that can be used to implement the function that was previously described in FIG. 2. The masks RIN and ROUT, given in box 602, determine how table 200 is rearranged to create table 600. Once table 600 is constructed, it can be used in the table lookup process by following the same steps as previously described in FIG. 3.

Figure 7:
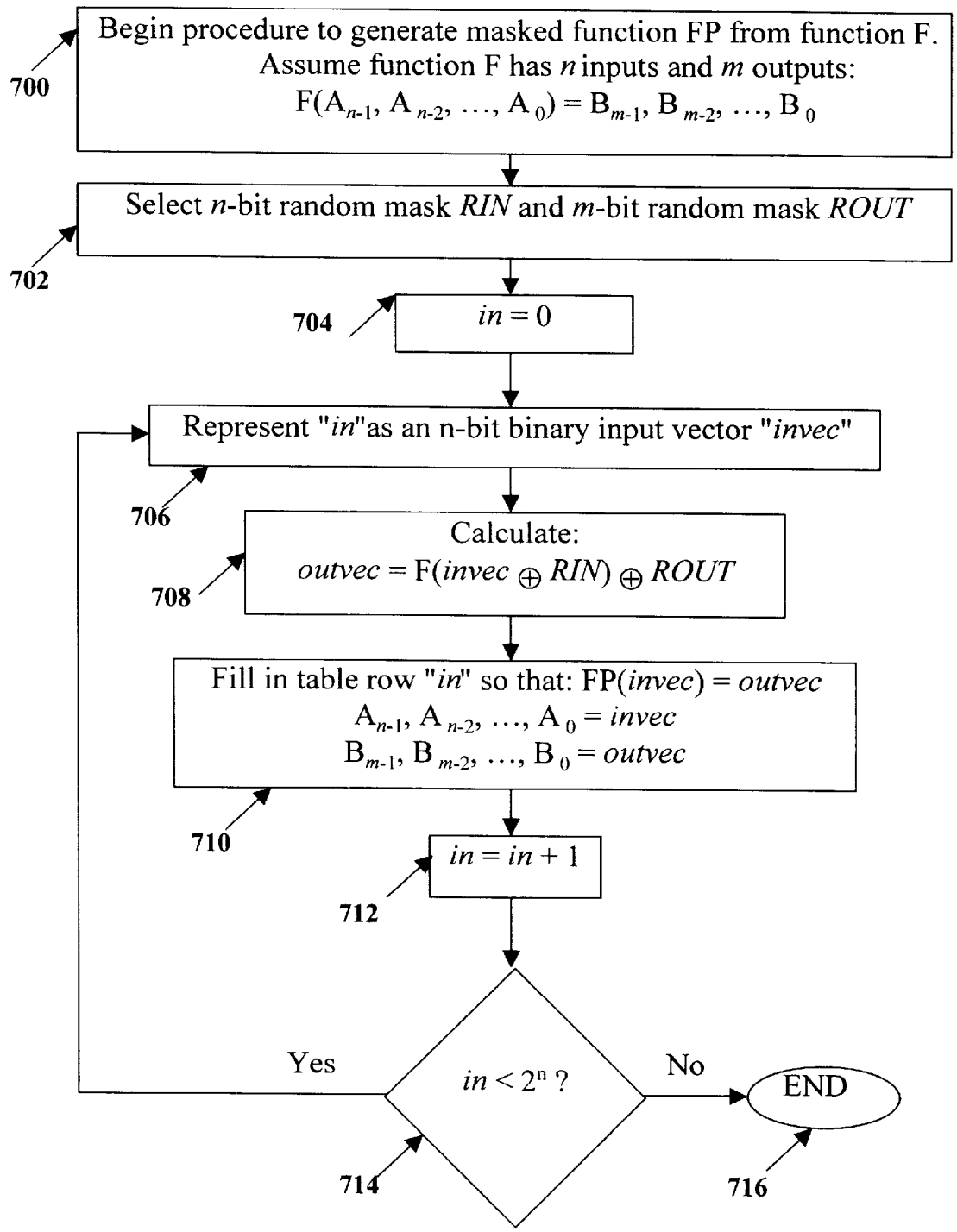
FIG. 7 is a representation of a flowchart illustrating steps used to create a lookup table according to the preferred embodiment of the present invention.

The general procedure used to create a rearranged table like the one in FIG. 6 is represented as a flowchart in FIG. 7. The purpose of the procedure of FIG. 7 is to generate the function FP from the original function F. The procedure of creating a table for FP begins in box 700 where it is assumed that function F has n inputs and m outputs. The next step 702 selects the random masks RIN and ROUT. The mask RIN has n bits and the mask ROUT has m bits. The variable "in" is then initialized to zero in box 704. In order to use "in" as an input to a function, it is converted to a binary input vector "invec" at step 706. Next, at step 708, outvec is set to the XOR of ROUT and the output of function F when the input is the XOR of invec and RIN. The table row "in" for function FP is now ready to be filled in with the outvec result. Step 710 fills in this row of data and then the variable "in" is incremented at step 712. Step 714 checks to see if "in" is less than $2^n$. If it is, then the procedure loops back to step 706, otherwise, the procedure is done and the table for FP has been completely filled.

Once the procedure of FIG. 7 is run and the table for FP is constructed, the block diagram of FIG. 5 and the table-lookup method can be used to calculate function F on masked inputs and produce masked outputs. An advantage of the present invention is that since the randomized function FP is used and the inputs and outputs to FP are masked, then any information leaked will not be useful for mounting an attack.

The present invention can be implemented using an apparatus composed of a 2:1 multiplexer tree with the addition of crossbar switches. Such an apparatus computes function F on masked inputs and produces masked outputs. An example apparatus to calculate the output B1 from table 200 of FIG. 2 is given in FIG. 8. The 2:1 multiplexer blocks in FIG. 8, labeled "2:1 MUX", are identical to the multiplexers used in FIG. 4. The boxes labeled "XBAR" are crossbar switches that have two data inputs, two data outputs and one select input. When the select input of a crossbar switch is a zero the inputs to go straight to the outputs and when the select input is a one, the inputs are swapped and then output. One skilled in the art of digital circuit design will recognize that a crossbar switch can be constructed using two 2:1 multiplexers.

Figure 8:
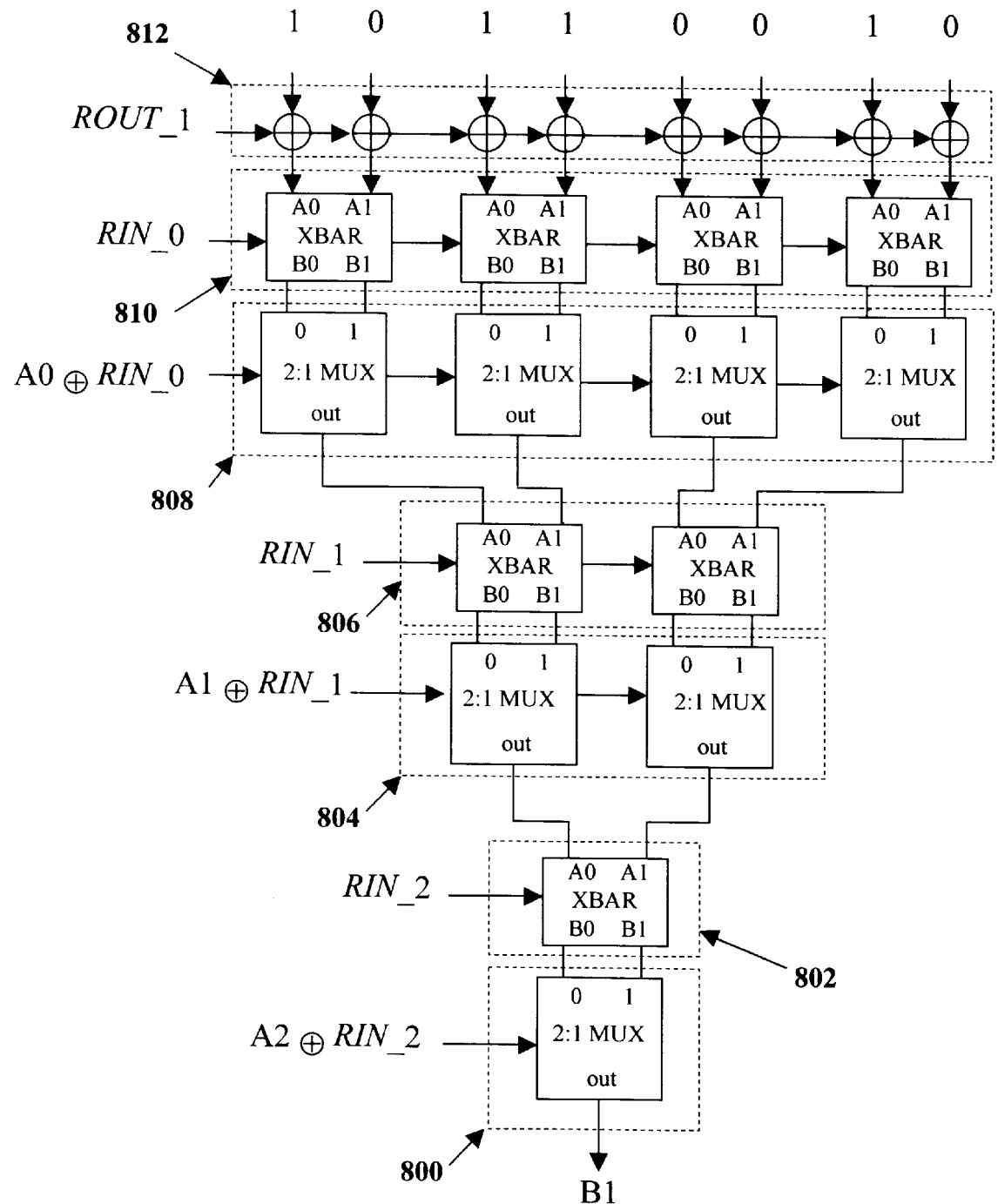
FIG. 8 is a representation of an example of a preferred embodiment of an apparatus according to the present invention for computing a function of masked inputs and producing masked outputs using a multiplexer and crossbar switch circuit.

The inputs to the multiplexer tree, A0, A1 and A2 of FIG. 8, have been bitwise XOR'ed with the mask RJN. The select input to the first level 800 of the tree is A2 masked with bit 2 of RJN, which is denoted as RIN_2. If the masking is performed with the XOR operation, then the select input to the first level 800 is denoted as A2⊕RIN_2. This notation means that the input to this level is the XOR of bit 2 of RIN with A2. The crossbar switch at level 802 is controlled by bit 2 of RIN or RIN_2. Thus, if RIN_2 is a zero, the select input to level 800 will not be inverted and the inputs to level 802 will not be switched, thus the function is unchanged. Likewise, if RIN_2 is a one, the select input to level 800 will be inverted and the inputs to level 802 will be switched by the crossbar switch, thus the function is again unchanged. There is a similar arrangement for levels 804, 806, 808 and 810. The design goal for each of these layers it to make sure no matter what the mask happens to be, the function is left unchanged. The top layer 812 is used to mask the eventual output of the blocks with the ROUT mask. In this case, bit 1 of ROUT is XOR'ed with all the potential output bits. Thus, whichever bit is eventually selected will be masked with ROUT.

The apparatus of FIG. 8 can be used to implement the function FP of box 500 in FIG. 5. The inputs and outputs are masked, so a leakage attack will not reveal any useful information to an attacker.

Each time function F needs to be calculated, instead function FP can be used. Prior to using FP, the masks RIN and ROUT are generated and the inputs are masked. If the table-lookup method is being used, then the table also needs to be constructed. If the multiplexer tree apparatus is being used, then this step can be skipped. Finally, the output of FP can be unmasked to reveal the true output.

Another advantage of the present invention arises in the computation of the round function in a cryptographic algorithm. A leakage attack can expose the secret key data of a cipher, so it is useful if this data can be masked. The round function needs to process this masked data, thus the present invention can be used to create a scrambled function, such as the previously described function FP, that can operate on masked inputs and also produce masked outputs.

Figure 9:
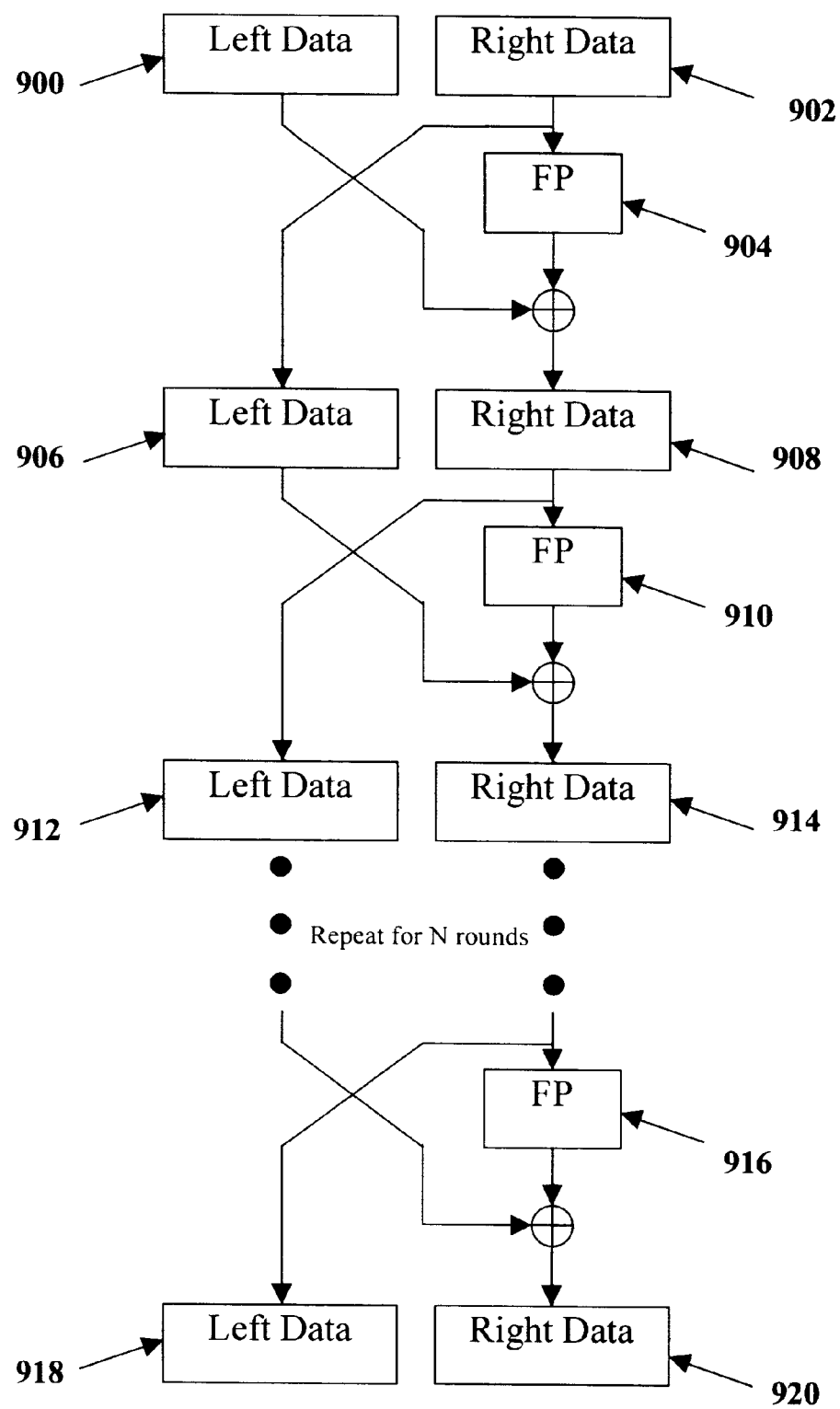
FIG. 9 is a representation of the present invention implementing the round function in a Feistel network cipher.

In an iterative block cipher the round function is repeatedly executed, so the masked output of one round can be used as the masked input to the next round. A generalized version of this type of cipher is known as a Feistel-network cipher. A block diagram of a Feistel network cipher is shown in FIG. 9. The conventional implementation takes the input data and splits it into a left data register 900 and a right data register 902. Using the present invention, the data from the right register 902 could be masked and then input to round function FP, which is labeled 904. The present invention provides a method to implement the round function FP so that the input to FP can be masked to prevent leakage attacks. Therefore, the present invention provides a method to implement any Feistel-network cipher in a way that is immune to a leakage attack.

The second round of the cipher in FIG. 9 begins at boxes 906 and 908. The left register 906 receives its input from the right register 902 and the right register 908 receives its input from the XOR of the masked output 904 of FP and the left data 900. Next, the right data 908, which is masked, is input to round function 910, which can be the same function as 904. When this round is completed, the results are stored in registers 912 and 914. The round functions are repeated until the last round, where round function 916 is computed and the results are saved in registers 918 and 920. At this time, the results can be unmasked to provide the correct output of the cipher.

If the cipher being implemented happens to be DES, then the round function that is implemented by FP could be the S-box function. The S-box function can be implemented using the table lookup method or the multiplexer tree method. In either case, the method or apparatus of the present invention can be used to eliminate the leakage of unintended information.

Figure 10:
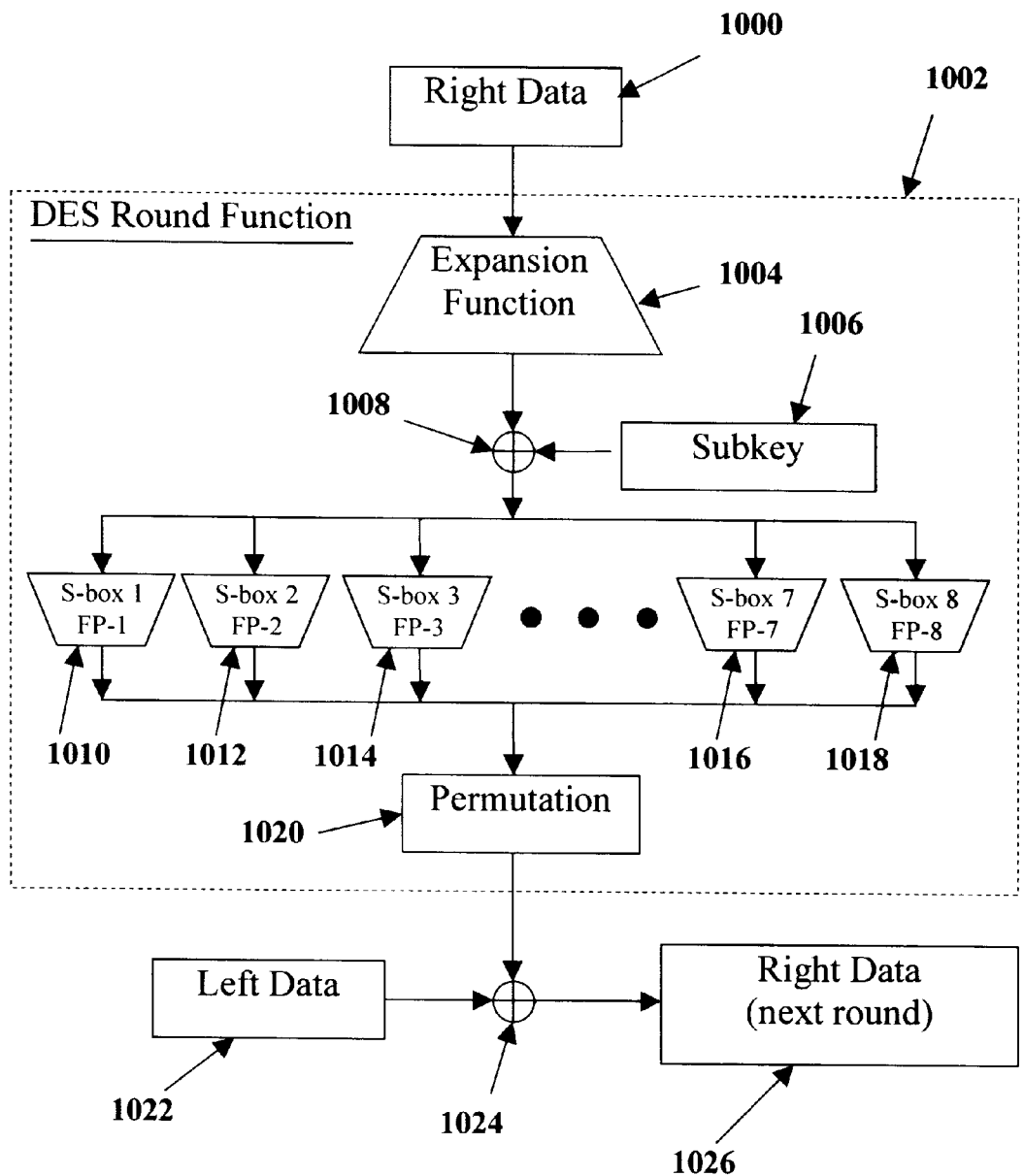
FIG. 10 is an illustration of the present invention implementing the substitution-box function in the Data Encryption Standard.

An aspect of the present invention utilized in the DES round function is illustrated in FIG. 10. The right data 1000 is input to the round function 1002. This data should be masked to prevent a leakage attack. The masked input data then goes through the standard DES expansion block 1004 and is combined with the subkey 1006 using the bitwise XOR gate 1008. The subkey 1006 and the output of the expansion function 1004 are both masked, so the output of XOR gate 1008 will be masked. This means the inputs to the eight DES S-box lookups 1010 to 1018 will all be masked. This is where the present invention can be used. Because the inputs to the S-box lookup functions are masked there is now a need to compute a function on masked inputs and to produce masked outputs.

Normally, the S-box lookups can be performed by using the table lookup method or by using Boolean logic gates such as in a multiplexer tree. However when the inputs are masked and the outputs need to be masked the normal S-box functions need to be transformed to the scrambled implementation using the method and/or apparatus of the present invention. Thus, S-box functions 1010 to 1018 are implemented using the present invention. The outputs of 1010 to 1018 are masked and provided as input to the permutation 1020. The output of permutation 1020 is, therefore, also masked. The output of the round function is provided to XOR gate 1024 along with the left data 1022 to produce the right data 1026 that is used in the next round.

It should be noted that by using the above scheme, the data being manipulated is always masked, thus any leaked information will not be of benefit to an attacker. It should also be noted that the random numbers used to mask the data and scramble the S-box functions can be generated prior to running DES. This makes the running of a masked version of DES much more efficient when the table lookup method is used, because the scrambled tables only need to be computed once at the beginning of an encryption.

Figure 11:
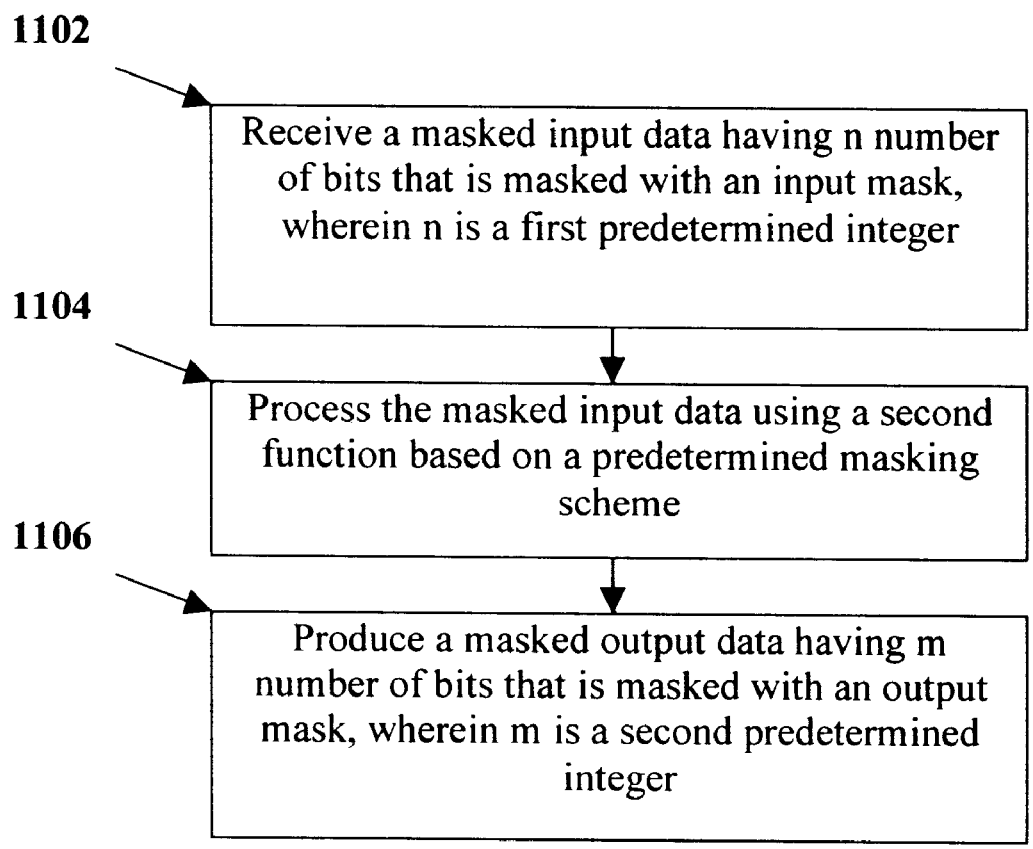
FIG. 11 illustrates a flowchart of a method according to the present invention.

FIG. 11 illustrates a flowchart of the method according to the present invention (described above), wherein the method includes the steps of receiving (1102) a masked input data having n number of bits that is masked with an input mask, wherein n is a first predetermined integer; processing (1104) the masked input data using a second function based on a predetermined masking scheme; producing (1106) a masked output data having m number of bits that is masked with an output mask, wherein m is a second predetermined integer.

The descriptions of the invention, the specific details, and the drawings mentioned above, are not meant to limit the scope of the present invention. For example, one of ordinary skill in the art will recognize that unpredictable data masks may be substituted for purely random data masks. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

We claim:

1. A method for preventing information leakage attacks on a microelectronic assembly performing a cryptographic algorithm by transforming a first function, used by the cryptographic algorithm, into a second function, the comprising the steps of:

receiving a masked input data having n number of bits that is masked with an input mask, wherein n is a first predetermined integer;

processing the masked input data using a second function based on a predetermined masking scheme;

producing a masked output data having m number of bits that is masked with an output mask, wherein m is a second predetermined integer.

2. The method of claim 1, further comprising the step of removing the output mask from the masked output data.

3. The method of claim 2, wherein the predetermined masking scheme utilizes a look-up table.

4. The method of claim 3, wherein the look-up table, having n input bits and m output bits, is constructed based on a first randomly generated input mask, at randomly generated output mask and the first function.

5. The method of claim 4, wherein the input data is masked with the first randomly generated input mask using a bitwise XOR operation.

6. The method of claim 4, wherein the output data is masked with the first randomly generated output mask using a bitwise XOR operation.

7. The method according to claim 4, wherein the step of removing the output mask from the output data includes the step of bitwise XORing the masked output data with the first randomly generated output mask.

8. The method of claim 1, wherein the first function is a substitution box (S-box) function of Data Encryption Standard (DES) algorithm.

9. An apparatus for preventing information leakage attacks on a microelectronic assembly, comprising:

a crossbar switch responsive to a first masked input and a second masked input that are masked based on a first mask, a control input based on a second mask, the crossbar switch providing a first output and a second output;

a multiplexer coupled to the first output and the second output of the crossbar switch, the multiplexer having an output, and a control input responsive to a control signal that is based on the second mask and an input to a first function.

10. The apparatus of claim 9, wherein the first mask and the second mask are randomly generated using a random number generator circuit.

11. The apparatus of claim 9, wherein the inputs to the crossbar switch are masked with the first mask using an XOR operation.

12. The apparatus of claim 9, wherein the input to the first function is masked with the second mask using an XOR operation.

* * * * *

UNITED STATES PATENT AND TRADEMARK OFFICE
CERTIFICATE OF CORRECTION

PATENT NO. : 6,295,606 B1  Page 1 of 1
DATED : September 25, 2001
INVENTOR(S) : Messerges, Thomas S., Dabbish, Ezzat A. and Puhl, Larry It is certified that error appears in the above-identified patent and that said Letters Patent is hereby corrected as shown below:

<u>Column 8,</u>
Line 10, change "at randomly " to -- a first randomly --

Signed and Sealed this

Twenty-eighth Day of May, 2002

Attest:

Attesting Officer

JAMES E. ROGAN
*Director of the United States Patent and Trademark Office*